United States Patent
Wiegmann et al.

(10) Patent No.: US 9,337,464 B2
(45) Date of Patent: May 10, 2016

(54) ELECTRICAL CONNECTION ARRANGEMENT AND ELECTRICAL CONNECTING ELEMENT AND RECHARGEABLE BATTERY ARRANGEMENT THEREFOR

(76) Inventors: Martin Wiegmann, Borstel (DE); Markus Hoh, Garbsen (DE); Ralf Joswig, Buchholz (DE); Henning Eisermann, Edemissen (DE)

(*) Notice: Subject to any disclaimer, the term of this patent is extended or adjusted under 35 U.S.C. 154(b) by 184 days.

(21) Appl. No.: 13/814,140

(22) PCT Filed: Jul. 22, 2011

(86) PCT No.: PCT/EP2011/003678
§ 371 (c)(1),
(2), (4) Date: Oct. 10, 2013

(87) PCT Pub. No.: WO2012/016644
PCT Pub. Date: Feb. 9, 2012

(65) Prior Publication Data
US 2014/0030933 A1 Jan. 30, 2014

(30) Foreign Application Priority Data
Aug. 4, 2010 (DE) .......... 10 2010 033 437

(51) Int. Cl.
*H01R 24/00* (2011.01)
*H01M 2/20* (2006.01)
*H01R 4/34* (2006.01)

(52) U.S. Cl.
CPC ............. *H01M 2/20* (2013.01); *H01M 2/202* (2013.01); *H01R 4/34* (2013.01)

(58) Field of Classification Search
CPC ...... H01R 4/64; H01R 13/658; H01R 13/187; H01R 13/658; H01R 11/12; H01R 4/34; H01R 4/185; H01R 4/26; H01R 4/305; H01R 13/2442; H01R 12/57; H01M 2/206; H01M 2/20; H01M 2/204

USPC .......... 439/627, 500, 927, 883; 42/158, 160; 429/158, 160
See application file for complete search history.

(56) References Cited

U.S. PATENT DOCUMENTS

| 5,360,355 | A | * | 11/1994 | Ehrler | H01R 4/304 439/816 |
| 6,305,991 | B1 | * | 10/2001 | Gerster | H01R 4/26 439/801 |
| 7,614,906 | B2 | * | 11/2009 | Kim | H01R 11/288 439/500 |
| 7,972,185 | B2 | * | 7/2011 | Kim | H01M 2/206 439/754 |
| 2006/0094289 | A1 | | 5/2006 | Kim et al. | |
| 2007/0099073 | A1 | * | 5/2007 | White | H01M 2/1055 429/158 |
| 2010/0015519 | A1 | | 1/2010 | Trester et al. | |

FOREIGN PATENT DOCUMENTS

| EP | 1014494 | 6/2000 |
| WO | 2007080896 | 7/2007 |

OTHER PUBLICATIONS

International Search Report and Written Opinion for PCT No. PCT/EP2011/003678, mailed Nov. 28, 2011, 11 pgs.

* cited by examiner

*Primary Examiner* — Abdullah Riyami
*Assistant Examiner* — Thang Nguyen
(74) *Attorney, Agent, or Firm* — Fletcher Yoder, P.C.

(57) ABSTRACT

The disclosure includes specifying an electrical connection arrangement, in particular for a rechargeable battery arrangement, having an electrical connecting element which permits the electrical energy to be transmitted between the rechargeable battery cells with as little loss as possible. In addition, there is disclosed an advantageous electrical connecting element in the form of a sheet-metal strip for the electrical connection arrangement.

9 Claims, 4 Drawing Sheets

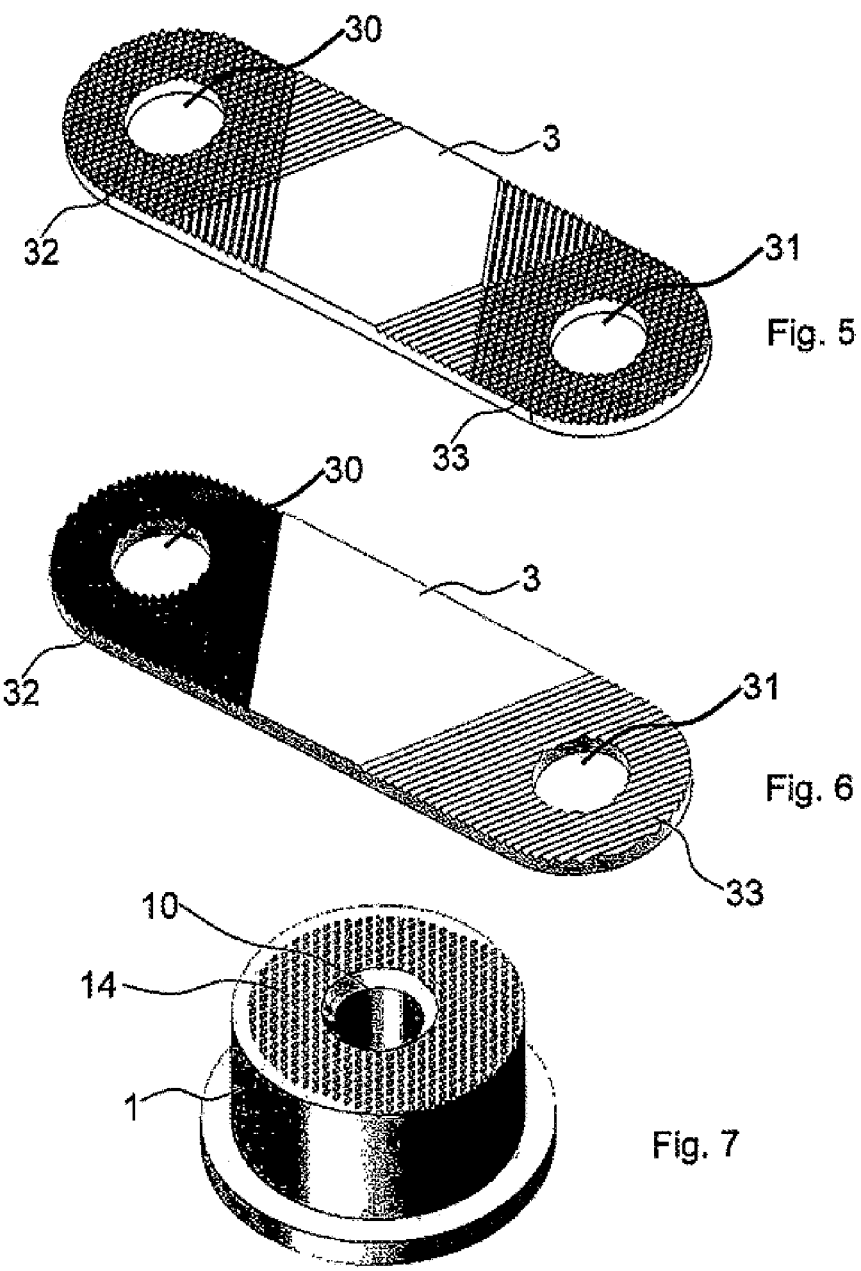

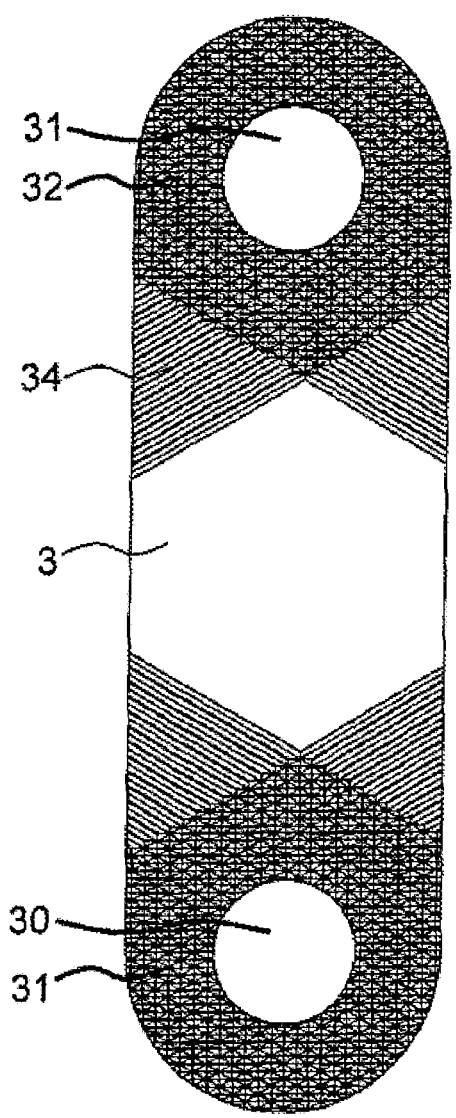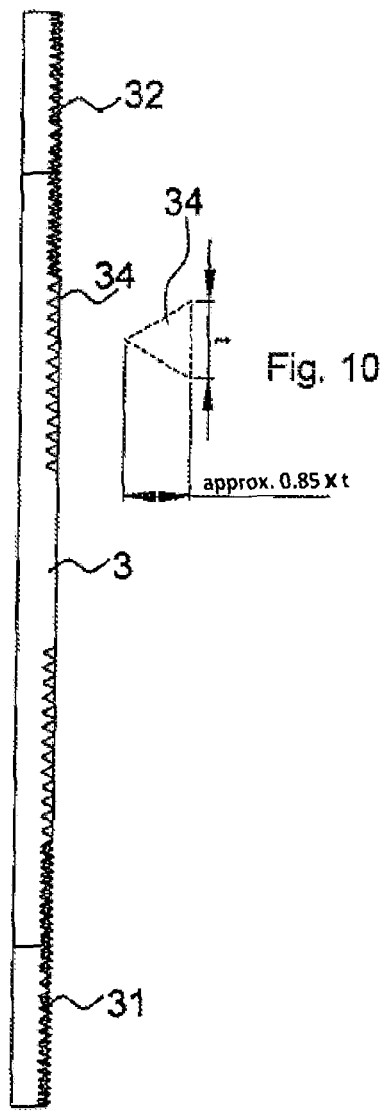
Fig. 8  Fig. 9  Fig. 10
approx. 0.85 × t

ELECTRICAL CONNECTION ARRANGEMENT AND ELECTRICAL CONNECTING ELEMENT AND RECHARGEABLE BATTERY ARRANGEMENT THEREFOR

CROSS REFERENCE TO RELATED APPLICATIONS

This application claims the benefit of and priority to German Patent Application No. 10 2010 033 437.5, filed Aug. 4, 2010, and International Application No. PCT/EP2011/003678, filed Jul. 22, 2011, the entire disclosures of which are incorporated herein by reference for all purposes.

BACKGROUND

The present application relates generally to the field of batteries and battery systems. More specifically, the present application relates to batteries and battery systems that may be used in vehicle applications to provide at least a portion of the motive power for the vehicle.

A rechargeable battery arrangement having a plurality of rechargeable battery cells usually has electrical connecting elements for connecting the poles of the rechargeable battery cells. The rechargeable battery cells are generally connected in series, if appropriate also connected groupwise in a parallel connection, by means of the electrical connecting elements. The electrical connecting elements may be embodied, for example, in the form of a sheet-metal strip, as is known, for example, from US 2010/0015519 A1. Such electrical connecting elements are also referred to as bridge connectors or as busbars. In order to transmit the electric current from one rechargeable battery cell to the next, it is desirable to minimize the contact resistances and therefore the losses.

SUMMARY

The disclosure includes specifying an electrical connection arrangement, in particular for a rechargeable battery arrangement, having an electrical connecting element which permits the electrical energy to be transmitted between the rechargeable battery cells with as little loss as possible. In addition, there is disclosed an advantageous electrical connecting element in the form of a sheet-metal strip for the electrical connection arrangement.

This permits a reduction in the contact resistance from one electrical terminal to the other electrical terminal by means of electrical connecting element with simple cost-effective means. The present techniques may begin with optimizing the contact faces at which the electrical connecting element is in contact with the electrical terminals. According to the previously acknowledged teaching, it has been attempted to configure the surfaces of these contact faces to be as smooth and level as possible in order in this way to maximize the contact and therefore minimize contact resistances. However, such optimization in the direction of ideal surface quality does not in fact lead to the desired objective since even smooth surfaces which have been optimized with a large degree of expenditure on manufacture and therefore at high cost have tolerances which in the microscopic range do not cause the contact faces of the connecting element and of the electrical terminal to bear one against the other in a uniform, two-dimensional planar fashion. This inherently gives rise to relatively high contact resistance, which according to the previous teaching would require a further increase in the fabrication precision of the surfaces.

The present technique departs from the prevalent teaching and instead proposes that at least one of the contact faces of the electrical connecting element and/or of the first or second electrical terminal be intentionally manufactured with a structured surface, and that the latter be configured in such a way that as a result of attachment of the electrical connecting element to the first and/or second electrical terminal, the structured surface is plastically deformed compared to the state present before the attachment of the electrical connecting element. As a result, a significant reduction in contact resistances is possible in a cost-effective way since the structured surface permits plastic adaptation at the contact face which is respectively located opposite, which gives rise to a maximization of the entire contact face. Depending on the configuration of the material hardnesses of the first and second electrical terminals and of the electrical connecting element, the structured surface can also plastically deform the contact face which is respectively located opposite, for example by means of stamping, as a result of the attachment of the electrical connecting element to the first and/or second electrical terminal. It is also possible to have a combination such that the structured surface itself is deformed plastically and the structured surface also plastically deforms the contact face lying opposite. Overall, this results in optimum adaptation of the profiles of the contact faces which bear one against the other.

There is provision here that the plastic deformation occurs as a result of attachment of the electrical connecting element to the first and/or second electrical terminal, for example in that the connecting element is attached to a thread on the electrical terminal by means of a screw or an attachment nut, and the screw or the attachment nut is correspondingly tightened until a desired plastic deformation is achieved. The tightening of the screw or of the attachment nut advantageously occurs with a prescribed tightening torque.

Particularly low-resistance junctions can be implemented with the present techniques since as a result of the surface structuring the contact faces not only bear against one another in a two-dimensional level fashion but also a three-dimensional structure is provided, as a result of which a larger overall contact face is produced than the two-dimensional extent of the contact faces.

The structured surface can have a regular or irregular shape. As a result, large degrees of freedom are permitted in the determining and the manufacture of the structured surface, which has the advantage that in each case particularly cost-effective manufacturing methods can be used. The structured surface may have, for example, a random pattern.

According to one advantageous development, the structured surface is embodied as a third-order shape deviation according to Deutsches Institut für Normung (i.e., German Institute for Standardization or "DIN") 4760. The structured surface therefore has a certain degree of roughness which may be embodied, for example, in the form of grooves. The structured surface may have a simple-groove arrangement and a cross-groove arrangement. The grooves may be profiled in different ways in a cross section, for example in a V shape or U shape.

The structured surface may be provided only on the electrical connecting element. The first and second electrical terminals therefore may not provided with a structured surface. This results in further cost advantages with respect to the manufacture of the electrical connection arrangement. It is therefore possible for the electrical terminals, for example the poles of rechargeable battery cells, to be manufactured in the same way as before. Switching over manufacturing steps is necessary only for the manufacture of the electrical connecting element. In addition, simple exchange and replacement of the electrical connecting elements is made possible since by using a new electrical connecting element here a new structured surface, which is not yet plastically deformed, is also used.

The electrical connecting element may be composed, at least in the region of its contact faces, of another material with a different material hardness than the first and/or the second electrical terminals in the region of its contact face. It is basically technically irrelevant which contact partner is made harder or softer. The material selection can therefore be made according to economic criteria, in particular according to the criteria of re-usability and costs of parts. It is advantageous, when connecting rechargeable battery cells, to make the electrical connecting element softer than the first and the second pole of the rechargeable battery cell, for example by soft annealing the electrical connecting element. In particular, soft-alloyed types of copper are advantageously used. Lead and aluminum and their alloys are also possible, for example.

When selecting the material hardnesses it may be desirable to ensure that when the electrical connecting element is attached to the first and/or the second electrical terminal, a sufficient pressing force can be applied without one of the connecting materials flowing away under this force or the attachment means being damaged, for example tearing off. Advantageous material hardnesses are in the range from 45 to 100 HV, for example.

The structured surface may have a peak-to-trough depth in the range from 0.25 to 1 mm. The peak-to-trough depth is measured here between the highest and the lowest point of the surface, for example between the upper edge and the trough of a groove. The peak-to-trough depth may be defined, in particular, as a function of the size of the electrical connecting element.

The structured surface may be stamped with a stamping tool. This has the advantage that the structured surface can be configured with less sharp edges, as a result of which notch effects and an associated risk of fracture in the region of the contact faces lying one against the other is reduced.

The electrical connecting element may have in each case a passage opening for feeding through an attachment means in the region of the contact faces of said connecting element. The attachment means may have, in particular, a thread embodied, for example, as a screw.

The disclosure also relates to an electrical connecting element in the form of a sheet-metal strip for connecting a first electrical terminal to a second electrical terminal, in particular for connecting a first rechargeable battery cell to a second rechargeable battery cell of a rechargeable battery arrangement of the type described above. The electrical connecting element has the structured surface on at least one of its contact faces.

The disclosure also relates to a rechargeable battery arrangement having at least a first rechargeable battery cell, a second rechargeable battery cell and an electrical connection arrangement of the type described above. Here, the first electrical terminal is a first pole of the first rechargeable battery cell, and the second electrical terminal is a second pole of the second rechargeable battery cell. As is apparent, the electrical connection arrangement according to the disclosure can, however, also be used advantageously for all types of electrical connections between two electrical terminals.

BRIEF DESCRIPTION OF THE DRAWINGS

The disclosure will be explained in more detail below with reference to exemplary embodiments and using drawings, in which:

FIG. 5 shows a first embodiment of an electrical connecting element,
FIG. 6 shows a second embodiment of an electrical connecting element,
FIG. 7 shows an embodiment of a terminal pole of a rechargeable battery cell,
FIG. 8 shows a third embodiment of an electrical connecting element in a plan view,
FIG. 9 shows the electrical connecting element according to FIG. 8 in a side view,
and
FIG. 10 shows a groove in an enlarged illustration.

DETAILED DESCRIPTION

In the figures, the same reference symbols are used for corresponding elements.

Figure 1:
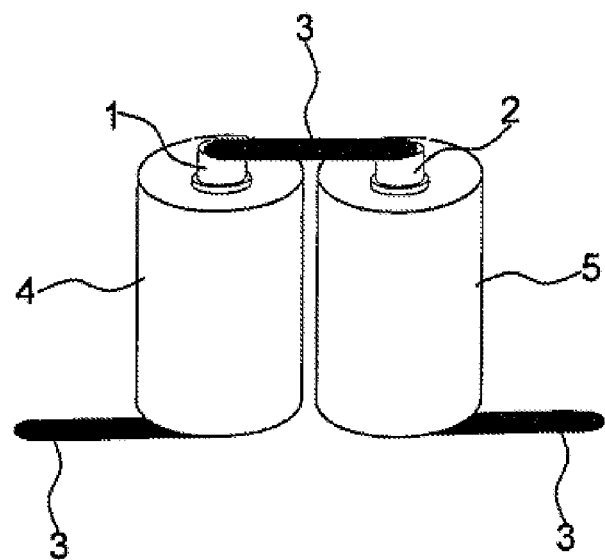
FIG. 1 shows a rechargeable battery arrangement.

FIG. 1 shows a rechargeable battery arrangement having a first rechargeable battery cell 4 and a second rechargeable battery cell 5. The first rechargeable battery cell 4 has a first pole 1 as a first electrical terminal. The second rechargeable battery cell 5 has a second pole 2 as a second electrical terminal. The first pole 1 is electrically and mechanically connected to the second pole 2 via an electrical connecting element 3 which is embodied in the form of a sheet-metal strip. Respective further electrical connecting elements 3, by which the rechargeable battery cells 4, 5 can be electrically connected to further rechargeable battery cells (not illustrated), are illustrated on the underside of the rechargeable battery cells 4, 5. As a result of the embodiment of the electrical connecting element 3 as a sheet-metal strip, not only is the electrical connection produced but at the same time a relatively rigid and stable mechanical connection is produced between the rechargeable battery cells, with the result that in many cases additional mechanical stabilization can be simplified, or can even be dispensed with.

Figure 2:
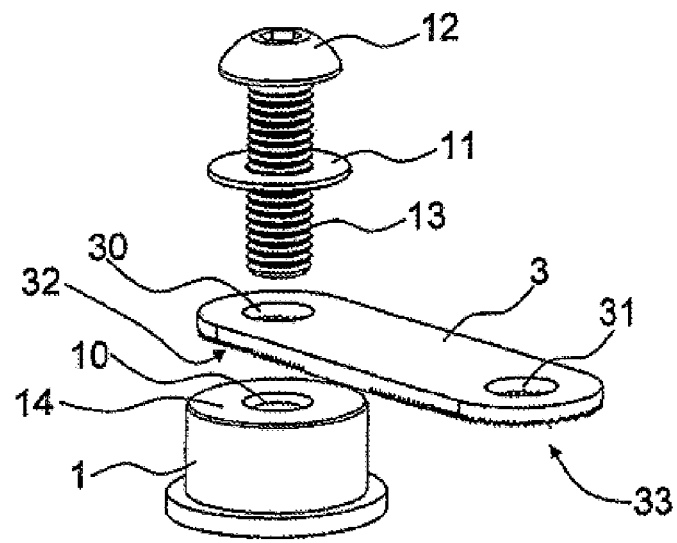
FIG. 2 shows an electrical connection arrangement.

FIG. 2 shows the connection between the first pole 1 and the electrical connecting element 3 in an enlarged illustration of a detail, wherein the first rechargeable battery cell 4 is not illustrated. The first pole 1 has a contact face 14 which is provided to come to bear against a corresponding, assigned contact face 32 of the electrical connecting element 3. The first pole 1 also has a passage opening 10 which is provided with an internal thread and runs in the longitudinal direction. The electrical connecting element 3 has a first passage opening 30 in the form of a drilled hole and a second passage opening 31 in the form of a drilled hole. In the region surrounding the second passage opening 31, the electrical connecting element 3 has a second contact face 33. The second passage opening 31 serves for feeding through a further attachment means in order to connect the electrical connecting element 3 to the second rechargeable battery cell 5. FIG. 2 also illustrates a screw 12 which serves as an attachment means. The screw 12 has, for example, a thread 13 which matches the internal thread of the passage opening 10 of the first pole 1. Furthermore, a washer 11 is arranged between the head of the screw 12 and the electrical connecting element 3.

Figure 3:
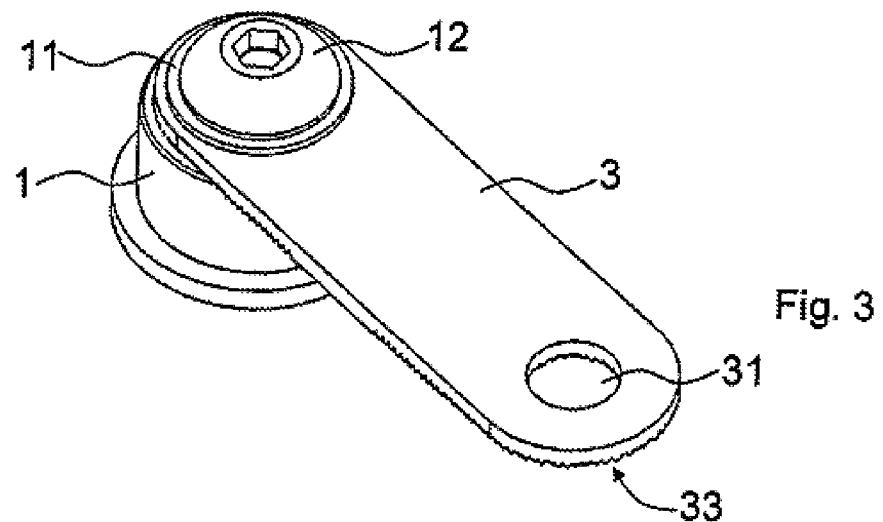
FIG. 3 shows the electrical connection arrangement according to FIG. 2 after the attachment of the electrical connecting element.

FIG. 3 shows the arrangement according to FIG. 2 in a state in which the electrical connecting element is attached to the first pole 1 by screwing the screw 12 into the internal thread of the passage opening 10.

Figure 4:
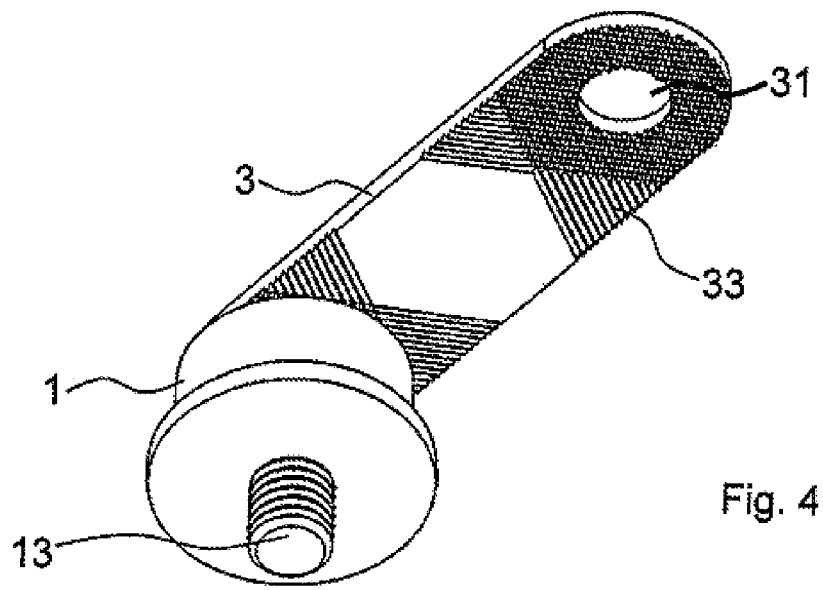
FIG. 4 shows the connection arrangement according to FIG. 3 from a lower view.

FIG. 4 shows the arrangement according to FIG. 3 in a view from below onto the electrical connecting element 3, i.e. in a view in which the second contact face 33 with its structured surface can be seen.

FIG. 5 shows a first embodiment of the electrical connecting element 3. As is apparent, both the first contact face 32 and the second contact face 33 are provided with a structured surface. The structured surfaces are embodied at least in the region of the contact faces 32, 33 in the form of a cross-groove arrangement, i.e. a first multiplicity of grooves which run parallel to one another and a second multiplicity of grooves which also run parallel to one another are present, wherein the second multiplicity of grooves is arranged at an angle to the first multiplicity of grooves.

FIG. 6 shows a second embodiment of the electrical connecting element 3 in which, at least in the region of the contact faces 32, 33, in each case a simple-groove arrangement is provided, i.e. in each case a multiplicity of grooves running parallel to one another is provided.

FIG. 7 shows the connecting pole 1 with the contact face 14, wherein it is apparent that the contact face 14 is also structured. The surface structure of the contact face 14 has been generated in this case by plastic deformation of the previously substantially level (smooth) surface of the contact face 14 owing to attachment of an electrical connecting element provided with a cross-groove arrangement, for example according to FIG. 5.

The described structured surfaces of the contact faces, as illustrated in FIGS. 5 and 6 with reference to the electrical connecting element, can also be provided on the respective contact face 14 of the first or second pole 1, 2. In this case, a pole 1, 2 is produced with a contact face 14 which looks comparable to the one illustrated in FIG. 7.

FIG. 8 shows an electrical connecting element 3 in which, at least in the region of the respective contact faces 32, 33, again a cross-groove arrangement is provided, for example by stamping with a stamping tool. FIG. 8 shows the electrical connecting element 3 in a plan view, and FIG. 9 shows the same electrical connecting element 3 in a side view. For example, details are given below of a groove 34 of the cross-groove arrangement in the region of the contact face 33. The groove 34 is illustrated enlarged in FIG. 10. As is apparent, the groove has a V-shaped profile. The groove depth is advantageously embodied in such a way that it corresponds to approximately 0.85 times the value of the groove width t. It has become apparent that as a result, particularly small contact resistances can be achieved.

What is claimed is:

1. An electrical connection arrangement comprising:
a first electrical terminal;
a second electrical terminal; and
an electrical connecting element embodied in the form of a sheet-metal strip, wherein the electrical connecting element connects the first electrical terminal to the second electrical terminal via respective contact faces provided on the electrical connecting element and on the first and second electrical terminals, wherein at least one of the contact faces of the electrical connecting element, the first electrical terminal or second electrical terminal has a structured surface comprising grooves with a cross-groove arrangement, wherein, as a result of attachment of the electrical connecting element to the first and/or second electrical terminal, the structured surface and/or the contact face respectively lying opposite the structured surface is plastically deformed compared to the state present before the attachment of the electrical connecting element, and wherein the electrical connecting element is composed, at least in the region of the contact faces, of a material with a different material hardness than the first electrical terminal, the second electrical terminal, or both in the region of its contact face,
wherein the cross-groove arrangement comprises a first plurality of grooves running parallel to one another and a second plurality of grooves also running parallel to one another, wherein the second plurality of grooves is arranged at a right angle to the first plurality of grooves.

2. The electrical connection arrangement as claimed in claim 1, wherein the structured surface has a third-order shape deviation according to DIN 4760.

3. The electrical connection arrangement as claimed in claim 1, wherein the structured surface is provided only on the electrical connecting element.

4. The electrical connection arrangement as claimed in claim 1, wherein the structured surface has a peak-to-trough depth in the range from 0.25 to 1 mm.

5. The electrical connection arrangement as claimed in claim 1, wherein the structured surface is stamped with a stamping tool.

6. The electrical connection arrangement as claimed in claim 1, wherein the electrical connecting element has in each case a passage opening for feeding through an attachment means, in particular a thread, in the region of the contact faces of the connecting element.

7. The electrical connecting element as claimed in claim 1, wherein the structured surface is provided on at least one of the contact faces of the electrical connecting element.

8. The electrical connecting element as claimed in claim 1, wherein the structured surface does not extend above a non-structured surface of the electrical connecting element.

9. The electrical connecting element as claimed in claim 1, wherein a depth of the grooves corresponds to approximately 0.85 times a value of a width of the grooves.

* * * * *